United States Patent
Sacks et al.

[11] Patent Number: 5,900,545
[45] Date of Patent: May 4, 1999

[54] STRAIN MONITORING SYSTEM

[75] Inventors: Ivor Selwyn Sacks, Chevy Chase, Md.; Dale W. Evertson, Nashville, Tenn.

[73] Assignee: Carnegie Institution of Washington, Washington, D.C.

[21] Appl. No.: 08/959,649

[22] Filed: Oct. 28, 1997

Related U.S. Application Data

[63] Continuation-in-part of application No. 08/733,007, Oct. 16, 1996, abandoned
[60] Provisional application No. 60/005,847, Oct. 23, 1995.

[51] Int. Cl.⁶ .................................................. E21B 49/00
[52] U.S. Cl. ..................................... 73/152.52; 73/152.02
[58] Field of Search ................................. 73/784, 152.02, 73/152.51, 152.52, 152.53, 152.01

[56] References Cited

U.S. PATENT DOCUMENTS

| | | |
|---|---|---|
| 2,957,341 | 10/1960 | Menard . |
| 3,099,823 | 7/1963 | Bobula et al. . |
| 3,633,408 | 1/1972 | Johnston . |
| 3,635,076 | 1/1972 | Sacks et al. . |
| 3,858,441 | 1/1975 | Comeau . |
| 4,598,591 | 7/1986 | Baud . |
| 4,858,472 | 8/1989 | Herget et al. . |
| 5,271,469 | 12/1993 | Brooks et al. . |
| 5,295,393 | 3/1994 | Thiercelin . |
| 5,579,283 | 11/1996 | Owens et al. ............................. 367/83 |

FOREIGN PATENT DOCUMENTS

| | | |
|---|---|---|
| 335564 | 2/1959 | Switzerland . |
| 0811068 | 3/1981 | U.S.S.R. . |
| WO 94/29572 | 12/1994 | WIPO .............................. E21B 47/12 |

Primary Examiner—Max H. Noori
Attorney, Agent, or Firm—Pillsbury Madison & Sutro, LLP

[57] ABSTRACT

A apparatus is provided for detecting deformation in solids in deep holes having a resilient vessel pre-stressed into a rock formation. The vessel is filled with fluid and is sealed except for an outlet tube of small diameter which extends all the way to, or close to, the surface. There the outlet tube terminates in an extensible bellows isolated from the atmosphere in an enclosed sealed vessel. The whole apparatus is completely filled with fluid. Any deformation of the vessel will cause fluid to be forced through the outlet tube and so cause the bellows to extend or contract. This motion can be monitored by any position-sensitive transducer such as a linear variable differential transformer or capacitance bridge. A second tube of the same length and size as the outlet tube is filled with the same fluid. This tube terminates at the bottom in close proximity to the resilient vessel. It also has a bellows and a displacement transducer at its upper end at the surface housed in an enclosed sealed vessel.

13 Claims, 1 Drawing Sheet

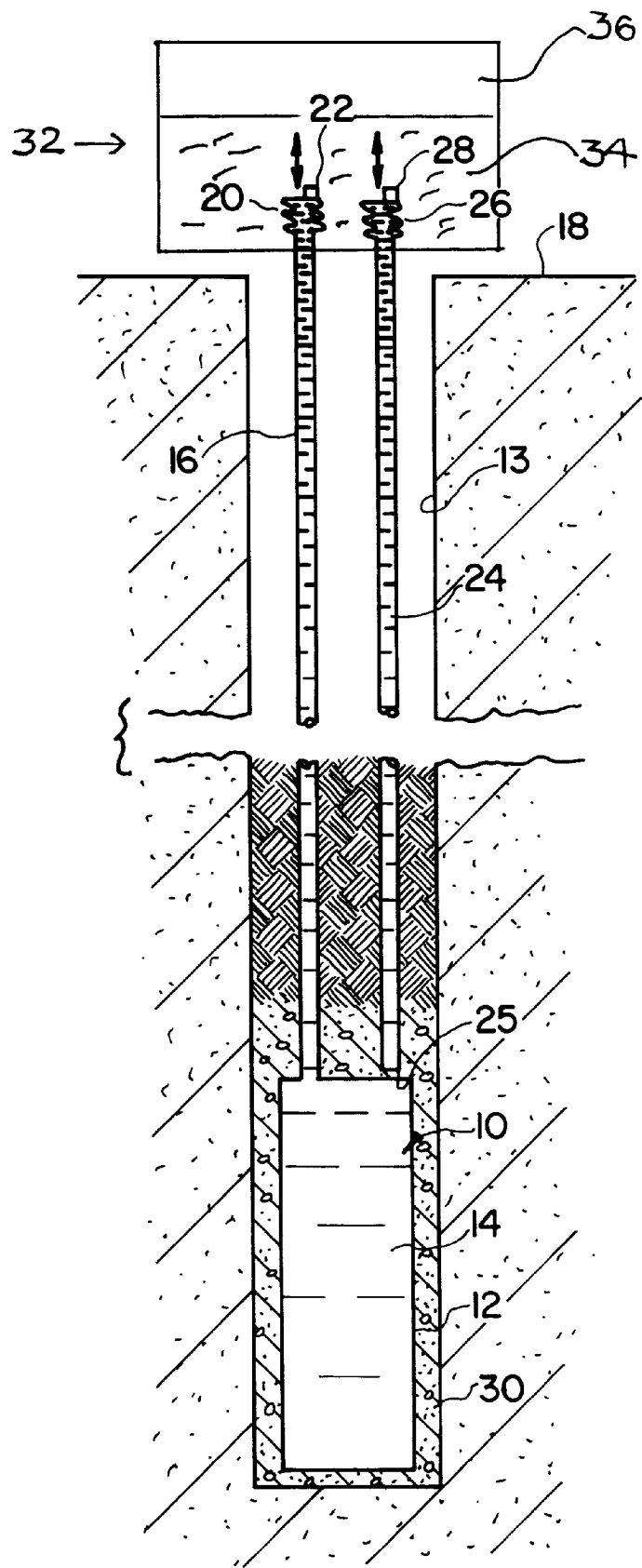

STRAIN MONITORING SYSTEM

This is a continuation-in-part application of application Ser. No. 08/733,007, filed Oct. 16, 1996, which is abandoned now, which is based on provisional U.S. application Ser. No. 60/005,847, filed Oct. 23, 1995.

BACKGROUND OF THE INVENTION

This invention relates to method and apparatus for monitoring and detecting strains and deformations in solids, and more particularly to method and apparatus adapted to detect strains within subterranean formations.

In accordance with one aspect, the invention relates to a strainmeter instrument and strain monitoring system capable of operating at great subterranean depths and measuring rock formation movement without being adversely affected by high temperatures in the rock formation.

The use of borehole strainmeters and systems to measure movement of subterranean rock formations is known. Many different strainmeters and systems have been devised for commercial use, but most have defects and limitations in operation, especially under extreme borehole depth conditions.

One known borehole strainmeter comprises a resilient metal tube prestressed into a borehole with an expansive grout so that the tube follows the deformation of the rock exactly. The deformation of this is amplified by hydraulic means and drives a small, thin-walled bellows, which in turn drives an electronic transducer. All power and signals reach the surface through an electric cable. There are a number of these devices in use worldwide.

However, because culturally induced noise decreases with depth, and because in many critical areas, e.g., Tokyo alluvial cover can be kilometers thick, and because earthquake faults lock at depth, there is a continuing and increasing need for more sensitive detectors capable of operating at multi-kilometer depths where temperatures are too high for electronics to survive for long periods of time.

SUMMARY OF THE INVENTION

An object of the invention is to provide a strain detecting system capable of operating effectively at multi-kilometer subterranean depths where temperatures are extremely high.

Another object of this invention is to provide a strain monitoring system free of down-hole electronics capable of producing accurate measurements of rock formation movement at multi-kilometer depths where temperatures are high.

The above objects are attained by providing a substantially enclosed vessel constructed and arranged to be insertable into a borehole extending into a subterranean formation. An elongated tube extends from the vessel and is in fluid communication therewith at a first end thereof. The tube has a length so that a second end thereof extends generally to the surface of the earth. Sensing structure is coupled to the second end of the tube. A fluid substantially fills the vessel and the tube. The vessel is constructed and arranged such that a deformation of solids surrounding the vessel that is transmitted to the vessel causes a change in volume in the vessel which in turn forces fluid into the tube thereby changing a volume of fluid in the tube. The sensing structure is constructed and arranged to detect a volume change in the tube, thereby detecting the deformation of the solids.

A second fluid filled small bore tube extends from the surface down into the borehole and terminates in close proximity to the vessel to compensate for any environmental effects between the vessel and the surface.

Another object of the invention is to provide a method for detecting deformation and strains in subterranean formations in the earth. The method includes placing a sensing apparatus into a borehole in a subterranean formation subject to elevated temperatures. The sensing apparatus includes a vessel, a first tube having a first end coupled to the vessel and in fluid communication therewith and a second end disposed generally at the surface of the earth. The vessel and the first tube are filled with fluid. The sensing apparatus includes sensing structure coupled to the second end of the first tube.

A prestressed tight fit is formed between walls of the borehole and exterior walls of the vessel so that deformation of rocks and solids surrounding the borehole is transmitted to the walls of the vessel which in turn produces volume changes in the vessel and the first tube.

The fluid volume displaced in the first tube is detected by the sensing structure to measure deformation in the subterranean formation.

Environmental effects of the volume of fluid in the first tube between the vessel and the surface of the earth are compensated by providing a second tube closed at its lower end and having substantially the same length, substantially the same volume and being filled with the same fluid as the first tube. Compensating sensing structure is coupled to a second end of the second tube to detect volume changes in the second tube which are compared with volume changes in the first tube.

Other objects, features and characteristics of the present invention, as well as the function of the related elements of the structure, and the combination of the parts and the economics of manufacture, will become more apparent upon consideration of the following detailed description and appended claims with reference to the accompanying drawing, all of which form a part of this specification.

DETAILED DESCRIPTION OF THE INVENTION

A better understanding of the invention will be obtained upon reference to FIG. 1 which is a schematic drawing of a sensing apparatus within a borehole in a subterranean formation and which is connected to a measuring system thereof at the surface.

The sensing apparatus, generally indicated at 10, consists of a resilient steel tube or vessel 12 prestressed into solids or rock at the end of a hole 13, so that it faithfully follows minute deformation in the rock. The vessel 12 thus formed is filled with fluid 14 and is sealed except for an outlet tube 16 of small diameter which extends all the way to, or close to, the surface 18. An extensible bellows 20 is coupled to an end of the tube 16, generally at the surface 18. The vessel 12 and tube 16 are completely filled with the fluid 14. Any deformation of the vessel 12 will cause fluid 14 to be forced through tube 16 and so cause bellows 20 to extend. Once the deformation is over, the bellows will return to a normal, relaxed condition. The motion of the bellows 20 can be monitored by any position-sensitive transducer 22 such as a linear variable differential transformer, or capacitance bridge. The bellows 20 and transducer 22 define a first sensing structure of the apparatus 10.

The fluid 14 used can be any fluid compatible with the structure of the device as described in U.S. Pat. No. 3,635,076, which is incorporated herein by reference thereto. Preferably, silicon oil has been found to be suitable for the purpose of the invention although chloroform-saturated water and other fluids can be used.

The apparatus 10 also includes tube 24 of is substantially the same length and of the identical diameter to tube 16. Tube 24 is also filled with the fluid 14. This tube 24 is terminated or closed at the bottom 25 thereof and a bellows 26 at the other end thereof. A displacement transducer 28 which is identical to transducer 22 of the first tube 16 is associated with bellows 26. Bellows 26 and transducer 28 define compensating sensing structure of the apparatus 10.

Extensible bellows 20 and 26 are isolated from the atmosphere in an enclosed sealed vessel 32 which is filled with liquid 34 and gas space 36. Liquid 34 can be any suitable liquid such as water, oil or the same liquid as fluid 14. Vessel 32 serves as a hydraulic sump and, in operation, functions as described in connection with FIGS. 3–5 of U.S. Pat. No. 3,635,076.

The purpose of gas space 36 is to allow bellows 20 and 26 to deform without significant restraint or back pressure. The absence of back pressure is essential to the operation of the sensing device. The gas pressure has no other pressure influences on it since vessel 32 (hydraulic sump) is completely sealed from the atmosphere. It should be emphasized that, since the admittance of the fluid in the two tubes (16 and 24) cannot be equal, it is in fact impossible to compensate for atmospheric pressure fluctuations if the hydraulic sump unit 32 is open to the atmosphere. This is because the pressure in the first tube 16 can deform the rock as well as the sensor interior compliance, whereas pressure changes in the second tube 24 can only effect fluid 14 and walls of tube 24.

Thus, the sensing structure at the surface comprises the extensible thin-walled fluid-filled bellows, 20 and 26, coupled to an associated linear variable differential transformer or a variable capacitance bridge or other suitable means 22 and 28, respectively. The voltage outputs of these differential transformers are digitized, commonly using 20 or 24 bit A to D converters, and the resulting data is stored in a computer (not shown). The signal generated from bellows 26, is subtracted from the signal generated from bellows 20, the function of which will become apparent below.

The purpose of the second tube 24 and bellows 26 is as follows: Since the apparatus 10 is intended to be installed at considerable depths, i.e., of order a mile or even much deeper, the tube 16 is long and may have a considerable volume. Any temperature or pressure change in the hole 13 may change the fluid volume in the tube 16 and so extend the bellows 20 spuriously. Exactly or nearly exactly the same extension will be caused in the companion tube 24 and bellows 26. Extension of bellows 26 may be subtracted from the extension of bellows 20 so that the genuine rock deformation signal which deforms vessel 12, can be obtained.

More specifically, the purpose of tube 24 is to compensate for the environmental effects, such as temperature changes, in the borehole between sensing unit 10 and the surface. The major disadvantage of a long tube leading from the sensing volume to the surface is change in the volume of fluid 14 in tube 16 which can swamp the size of fluid changes in the sensing volume due to earth strain. Since tube 16 is quite long, the volume in tube 16 can be more than that in the sensing volume and small changes in tube volume would constitute a spurious signal. It is to compensate for these changes that a second, carefully matched tube 24 is used.

The apparatus 10 is positioned at the desired point in the earth by drilling the borehole 13 to the desired depth, filling the lower portion of the hole 13 with coupling structure in the form of a charge of packing concrete 30 and the lowering the vessel 12 into the concrete 30. By use of an expansive cement, the packing concrete expands upon curing, thereby intimately coupling the walls of vessel 12 with the surrounding structure. In the apparatus 10 disclosed, prestressing of vessel 12 on the order of about 7 lbs. per square inch occurs after the packing is cured.

As the strain in the surrounding structure changes, the hole 13 will be distorted and the wall of vessel 12 will follow the hole deformation. As the wall of vessel is deformed, the volume of the fluid 14 in the vessel 12 changes and the pressure in the fluid therein thereby changes, which pressure change is hydraulically transmitted to the surface through outlet tube 16 and sensed by extensible bellows 20. The thickness of the walls of vessel 12 is chosen such that the rigidity thereof is on a par with that of the surrounding earth structure.

The extensible bellows 20 and 26 are, for example, sylphon bellows, coupled to a differential transformer as described in U.S. Pat. No. 3,635,076. The transformer provides an electrical indication of the change in length of the bellows in a manner known in the art.

Since fluid is continuous to the surface in the tube 16 the pressure at vessel 12 can be made approximately equal to the ambient pressure by choice of fluid density. Thus, thinner wall tubing which is more responsive to rock deformation, can be used. In addition, the high operating pressure in the vessel suppresses the boiling point of the fluids used.

It can be appreciated that the sensing apparatus provides an effective means of measuring strains and deformations is solids. Since there are no down-hole electronics, operating temperatures are unrestricted. The provision of the second tube ensures accurate sensing regardless of temperature or pressure changes which may occur in the apparatus. Further, the sensing apparatus is pressure balanced obviating the need for thick walled tubing, which attenuates the deformation signal.

It has thus been seen that the objects of this invention have been fully and effectively accomplished. It will be realized, however, that the foregoing preferred embodiment has been shown and described for the purposes of illustrating the structural and functional principles of the present invention and are subject to change without departure from such principles. Therefore, this invention includes all modifications encompassed within the spirit of the following claims.

What is claimed is:

1. An apparatus for detecting strains and deformations at depths in subterranean rock formations in the earth where temperatures are too high for electronics to survive for long periods of time comprising:

a substantially enclosed vessel constructed and arranged to be insertable into a borehole extending into a subterranean formation subject to elevated temperatures;

an elongated tube extending from said vessel and in fluid communication therewith at a first end thereof, said tube having a length so that a second end thereof extends generally to the surface of the earth;

sensing structure isolated from the atmosphere in an enclosed sealed vessel coupled to said second end of the tube; and a fluid substantially filling the vessel and the tube, said vessel being constructed and arranged and rigidly coupled to solid into which the enclosed vessel is inserted such that a deformation of solids surrounding said vessel that is transmitted to said vessel causes a change in volume in said vessel which in turn forces fluid into said tube thereby changing a volume of fluid in said tube, said sensing structure being constructed and arranged to detect a volume change in said tube, thereby detecting the deformation of the solids, said apparatus being fluid pressure balanced obviating the need for a thick walled vessel which attenuates deformation signals.

2. An apparatus in accordance with claim 1, further comprising coupling structure constructed and arranged to rigidly couple exterior walls of the vessel to walls of the borehole by prestressing the walls of the vessel during installation thereof to transmit deformation of the solids surrounding the borehole to the walls of the vessel.

3. An apparatus in accordance with claim 2, wherein said coupling structure comprises an expandable concrete.

4. An apparatus in accordance with claim 1, wherein the sensing structure comprises a first bellows communicating with the fluid in the vessel via said tube and a differential transformer coupled to the bellows and operable thereby.

5. An apparatus according to claim 1, wherein the sensing structure comprises an extensible thin-walled bellows coupled to a transducer which generates signals representative of the fluid level in the bellows.

6. An apparatus according to claim 5, wherein the transducer is a variable differential transformer.

7. An apparatus according to claim 5, wherein the transducer is a capacitance bridge.

8. An apparatus for detecting strains and deformations in subterranean rock formations in the earth comprising:
   a substantially enclosed vessel constructed and arranged to be insertable into a borehole extending into a subterranean formation;
   an elongated tube extending from said vessel and in fluid communication therewith at a first end thereof, said tube having a length so that a second end thereof extends generally to the surface of the earth;
   sensing structure isolated from the atmosphere in an enclosed sealed vessel coupled to said second end of the tube;
   an elongated compensating tube filled with said fluid having a length such that a first end thereof is disposed generally at the surface with a second end thereof disposed generally adjacent said vessel, said second end being closed;
   compensating sensing structure being coupled to said first end of said compensating tube, said compensating sensing structure being isolated from the atmosphere in an enclosed sealed vessel and constructed and arranged to detect a volume change in said compensating tube to compensate for temperature effects between the vessel and the surface; and
   a fluid substantially filling the vessel and the tube, said vessel being constructed and arranged such that a deformation of solids surrounding said vessel that is transmitted to said vessel causes a change in volume in said vessel which in turn forces fluid into said tube thereby changing a volume of fluid in said tube, said sensing structure being constructed and arranged to detect a volume change in said tube, thereby detecting the deformation of the solids.

9. An apparatus according to claim 8, wherein the compensating sensing structure comprises an extensible compensating bellows coupled to a transducer which generates signals representative of the fluid level in the compensating bellows.

10. An apparatus according to claim 1, wherein said fluid is one of silicon oil and chloroform-saturated water.

11. A device for detecting strains and deformations in subterranean rock formations in the earth comprising:
   a substantially enclosed vessel insertable into a borehole extending into a subterranean formation;
   a first tube having a first end connected to an upper portion of the vessel and a second end, said first tube having a length so that said second end is disposed generally at the surface of the earth;
   first sensing structure isolated from the atmosphere in an enclosed sealed vessel coupled to said second end of said tube;
   a fluid substantially filling the vessel and in fluid communication with the interior walls of the vessel and filling the first tube;
   coupling structure constructed and arranged to couple walls of the vessel to walls of the borehole by prestressing the walls of the vessel during installation thereof to transmit deformation of rock and solids surrounding the borehole to the walls of the vessel and to produce volume changes in the vessel;
   a second tube filled with fluid and having first and second ends, said second tube having a length such that said first end thereof may be disposed generally adjacent said upper portion of said vessel with said second end of said second tube being disposed generally at the surface of the earth; and
   second sensing structure isolated from the atmosphere in an enclosed sealed vessel coupled to said second end of said second tube, said first end of said second tube being closed;
   said vessel being constructed and arranged such that deformation of solids surrounding said vessel that are transmitted to said vessel causes a change in volume in said vessel which in turn forces fluid into said first tube thereby displacing the volume of fluid in said first tube, said first sensing structure being constructed and arranged to detect a volume displacement in said first tube, thereby detecting the deformation of the solids, said second sensing structure being constructed and arranged to detect a volume displacement in said second tube to compensate for environmental effects between the vessel and the surface.

12. A method for detecting deformation and strains in subterranean formations in the earth which comprises:
   placing a sensing apparatus into a borehole in a subterranean formation subject to elevated temperatures, said sensing apparatus including a vessel, a first tube having a first end coupled to the vessel and in fluid communication therewith and a second end disposed generally at the surface of the earth, said vessel and said first tube being filled with fluid, said sensing apparatus including sensing structure isolated from the atmosphere housed in sealed hydraulic sump coupled to said second end of said first tube;
   forming a prestressed tight fit between walls of the borehole and exterior walls of the vessel so that deformation of rocks and solids surrounding the borehole is transmitted to the walls of the vessel which in turn produces volume changes in the vessel and fluid displacement in the first tube;
   detecting the fluid volume displaced in the first tube by use of said sensing structure to measure deformation in the subterranean formation; and
   compensating for environmental effects of the volume of fluid in said first tube between said vessel and the surface of the earth by providing a second tube closed at its lower end and having substantially the same length, substantially the same volume and being filled with the same fluid as the first tube, compensating sensing structure isolated from the atmosphere in a sealed hydraulic sump coupled to a second end of said second tube to detect volume displacement in said second tube which is compared with volume displacement in said first tube.

13. A method according to claim 12, wherein the sensing structure of the first tube and the compensating sensing structure of said second tube each comprises a flexible expandable chamber and a transducer, the method including measuring a level of fluid in each expandable chamber and determining a difference in fluid level in the expandable chambers.

* * * * *